Figure 1:
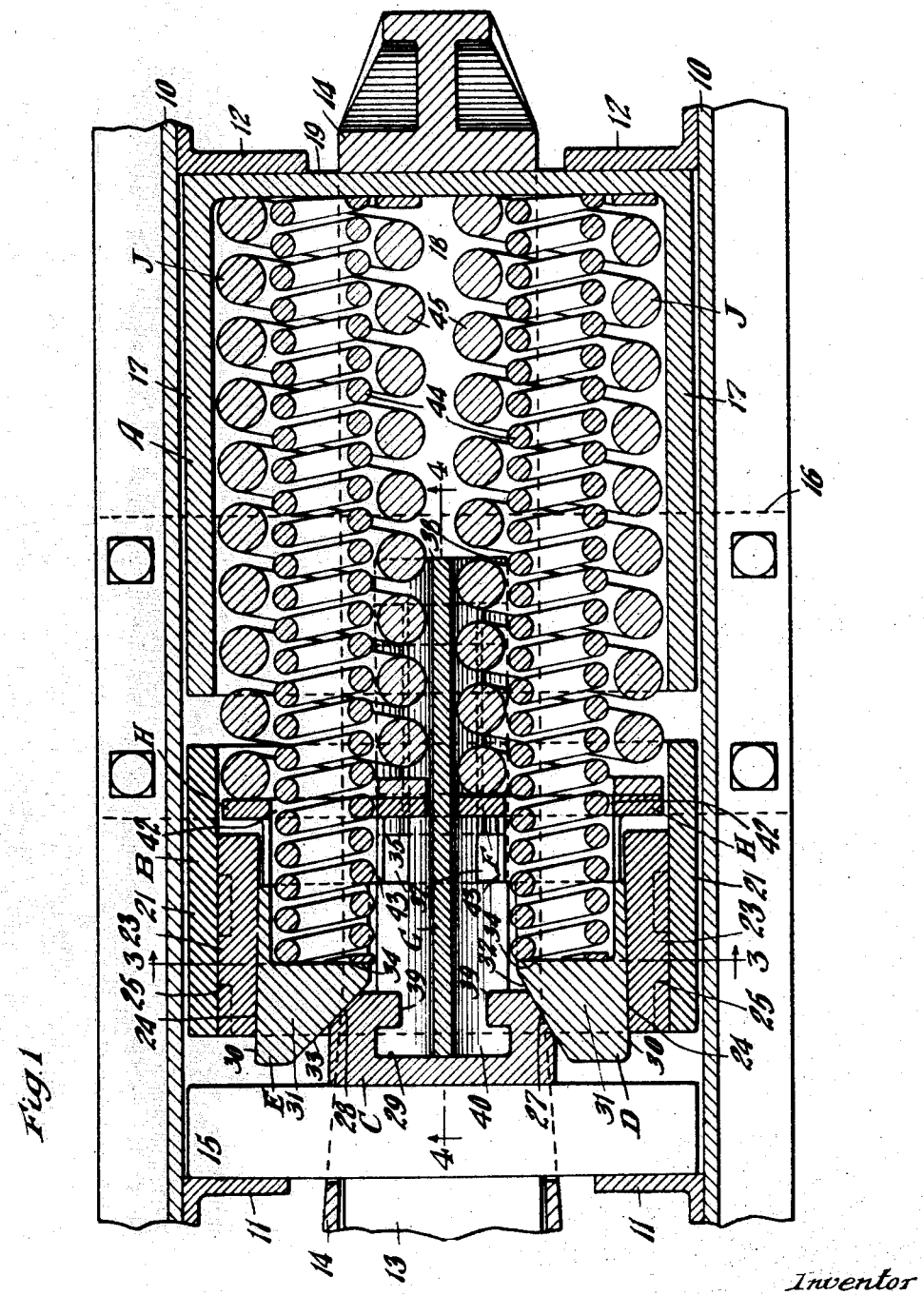

Dec. 25, 1928.  
J. F. O'CONNOR  
1,696,320  
FRICTION SHOCK ABSORBING MECHANISM  
Filed Feb. 28, 1927   2 Sheets-Sheet 1

Witness  
Wm. Geiger

Inventor  
John F. O'Connor  
By George I. Haight Atty.

Dec. 25, 1928.  J. F. O'CONNOR  1,696,320
FRICTION SHOCK ABSORBING MECHANISM
Filed Feb. 28, 1927   2 Sheets-Sheet 2
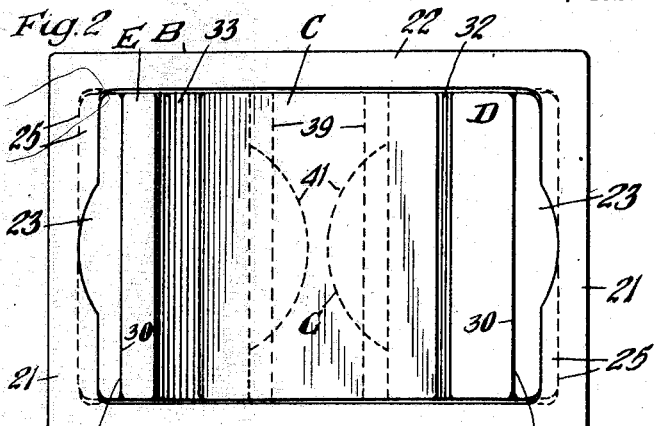
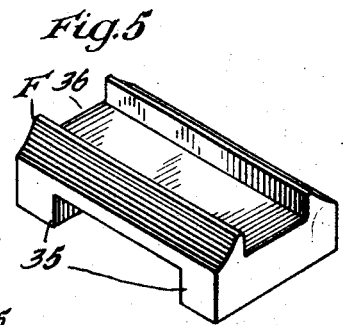
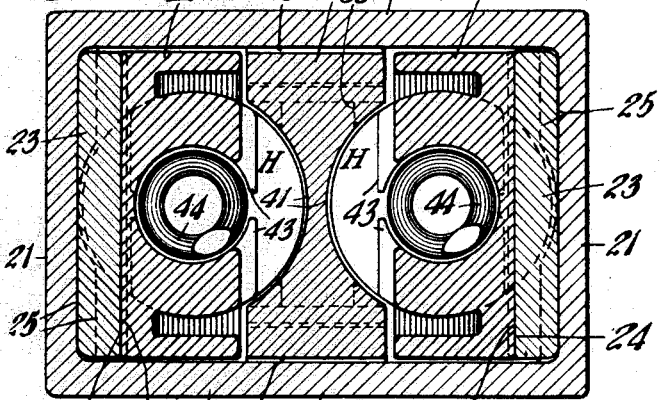
Witness
Wm. Geiger
Inventor
John F. O'Connor
By George I. Haight Atty.

Patented Dec. 25, 1928.

1,696,320

UNITED STATES PATENT OFFICE.

JOHN F. O'CONNOR, OF CHICAGO, ILLINOIS, ASSIGNOR TO W. H. MINER, INC., OF CHICAGO, ILLINOIS, A CORPORATION OF DELAWARE.

FRICTION SHOCK-ABSORBING MECHANISM.

Application filed February 28, 1927. Serial No. 171,406.

This invention relates to improvements in friction shock absorbing mechanisms.

One object of the invention is to provide a friction shock absorbing mechanism especially adapted for railway draft rigging, including a spring cage and friction shell having limited relative movement together with friction means co-operating with the shell resisted by spring means disposed within the shell, the shell and friction means being relatively movable in unison to effect compression of the spring resistance during a predetermined portion of the compression stroke to produce relatively light resistance and movement of the shell being positively limited after said predetermined compression to compel movement of the friction elements with respect to the shell to produce high capacity, wherein interlocking, readily detachable means of rugged design is provided for anchoring the shell and wedge means to the cage.

Other objects and advantages of the invention will more fully and clearly appear from the description and claims hereinafter following.

In the drawings, forming a part of this specification, Figure 1 is a horizontal longitudinal sectional view of a portion of a railway draft rigging, showing my improvements in connection therewith. Figure 2 is a front end elevational view of the shock absorbing mechanism proper. Figure 3 is a transverse vertical sectional view corresponding substantially to the line 3—3 of Figure 1. Figure 4 is a longitudinal vertical sectional view of the front end portion of the shock absorbing mechanism illustrated in Figure 1 and corresponding substantially to the line 4—4 of said figure. And Figure 5 is a detailed perspective view of one of the anchoring elements employed for holding the friction shell and spring cage of the shock absorbing mechanism assembled.

In said drawings, 10—10 indicate channel-shaped center or draft sills of a railway car underframe, to the inner sides of which are secured front stop lugs 11—11 and rear stop lugs 12—12. The inner end portion of the drawbar is designated by 13, to which is operatively connected a yoke 14 of well-known form. The shock absorbing mechanism proper and a front main follower 15 are disposed within the yoke, and the yoke in turn is supported by a detachable saddle plate 16 fixed to the draft sills.

The improved shock absorbing mechanism comprises broadly: A spring cage A; a friction shell B; a wedge block C; friction shoes D and E; anchoring elements F—F; for connecting the friction shell and spring cage; a wedge retaining means G; a pair of spring followers H—H; and twin arranged spring resistance elements J.

The spring cage A is in the form of a substantially rectangular box-like casting having longitudinally disposed vertical side walls 17—17, horizontal disposed longitudinally extending spaced top and bottom walls 18, and a transverse vertical end wall 19. The end wall 19 co-operates with the stop lugs 12 in the manner of the usual rear follower. At the forward end, the top and bottom walls 18 of the cage A are provided with centrally disposed projecting lugs 20—20 for a purpose hereinafter described.

The friction shell B is also in the from of a substantially rectangular box-like casing and is open at its front and rear ends. The casing has longitudinally disposed vertical spaced side walls 21—21 and horizontally disposed spaced top and bottom walls 22—22. The side walls 21 are provided with interior liners 23 having flat inner friction surfaces 24 converging inwardly of the mechanism. The liners 23 are detachably mounted on the side walls of the shell by interengaging lug and slot connections designated by 25. It will be evident that the liners are thus held against longitudinal movement with respect to the friction shell. The top and bottom walls 22 of the friction shell are provided with interior central lugs 26 at the rear end thereof.

The wedge block C has a front flat face bearing directly on the inner side of the main follower 15. At the inner end, the wedge is provided with a pair of inwardly converging wedge faces 27 and 28, the wedge face 27 being inclined at a relatively keen wedge acting angle with respect to the longitudinally axis of the mechanism and the wedge face 28 being inclined at a relatively blunt angle with respect to said axis. The wedge block C is provided with a vertical T-shaped slot 29 which serves to receive the connecting means on the retaining element G.

The friction shoes which are two in number, are disposed at opposite sides of the mechanism. The two shoes which are indicated by D and E, are of similar design, except as hereinafter pointed out. Each shoe has a flat outer longitudinally disposed friction surface 30 co-operating with the friction surface 25 of the friction shell. On the inner side, each shoe is laterally enlarged as indicated at 31, the enlarged portion thereof being provided with an outer wedge face adapted to co-operate with the wedge face at the same side of the wedge block C. The wedge face of the shoe D is designated by 32 and is correspondingly inclined to and adapted to co-operate with the wedge face 27 of the block C. The wedge face of the shoe E is designated by 33 and is adapted to co-operate with the wedge face 28 on the wedge block C. The inner ends of the enlargements of the shoes present flat transverse abutment faces 34 adapted to co-operate with the outer ends of the central coils of the twin arranged spring resistance elements J.

The spring cage A and friction shell B are connected for lost motion by the connecting or anchoring members F. Each of the anchoring members F as most clearly shown in Figure 5, is in the form of a relatively heavy rectangular plate having projecting transverse flanges 35 at the opposite ends thereof. On the side opposite the flanges, the plate F is longitudinally slotted as indicated at 36 for a purpose hereinafter described. The opposite longitudinal edges of the plate F at the slotted side thereof are cut away to present concave faces to accommodate the sides of the two heavy outer coils of the spring resistance means. As most clearly shown in Figures 1 and 4, each of the connecting plate members F has the front and rear flanges 35 thereof engaged behind the lugs 20 and 26 of the spring cage and friction shell respectively. The plates are disposed above and below the retaining element G and are held in position thereby. It will be evident that by the lost motion connection provided, the friction shell and spring cage will have a certain amount of limited relative movement and outward movement of the friction shell B with respect to the spring cage A will be positively limited.

The retaining element G is in the form of a relatively heavy bar cut away at the top and bottom between the ends thereof as indicated at 37—37 to accommodate the corresponding anchoring elements F. It will be noted that the cut away portions 37 are of somewhat greater length than the anchoring members F, thereby providing for a certain amount of relative movement between the retaining element and the anchoring elements F. At the rear end, the retaining element G is provided with top and bottom projecting portions 38—38 presenting lugs engaging behind the flanges 35 of the anchoring elements F. At the forward end, the opposite sides of the retaining member G are vertically slotted as indicated at 39, thereby leaving a T-headed front end 40 adapted to engage within the slotted section 29 of the wedge C. The opposite sides of the retaining element G are cut away as indicated at 41 in Figure 3, to provide concave recesses adapted to accommodate the sides of the outer coils of the spring resistance J.

The spring followers H—H are in the form of plate-like members and are provided with central openings 42 adapted to freely accommodate the inner coils of the twin spring resistance elements. Each spring follower is also provided with a forwardly projecting annular flange 43 surrounding the opening thereof and engaging the inner end of the corresponding friction shoe.

The spring resistance J comprises two sets of twin arranged coils, each set comprising a relatively light inner coil 44 and a relatively heavier outer coil 45. The coil 45 of each set has the opposite ends thereof bearing on the inner end of the corresponding spring follower and the end wall 19 of the spring cage A. The inner coil 44, as most clearly shown in Figure 1, is of considerably greater length than the outer coil and projects through the opening 42 of the corresponding spring follower and has its front end bearing on the transverse abutment face 34 of the corresponding friction shoe and the rear end thereof bearing on the end wall 19 of the spring cage. When the mechanism is assembled, the parts are preferably placed under initial compression so that the springs will tend to force the friction shoes outwardly, thereby compensating for wear of the various wedge and friction surfaces.

In assembling the mechanism, the anchoring elements are inserted and engaged with the lugs of the friction shell and spring cage, the wedge retaining element G having first been assembled with the anchoring elements F with the lugs thereof engaging the inner ends of the elements F. The main springs, spring followers and friction shoes are then inserted through the front end of the friction shell, the side walls of the shell being cut away as shown in Figure 2 to permit this. After the parts have been thus assembled, the liners are placed in position and the wedge block C is attached to the front end of the wedge retaining element G. In order to attach the wedge C to the retaining element G, the parts are compressed so that the shell will engage the front end of the spring cage and the shoes will be positioned inwardly a sufficient distance to permit the slot 29 of the wedge C to be engaged with the T-head 40 of the retaining element G. After the wedge has been thus connected to the retaining element, the parts are permitted to expand, whereby the front edge of the friction shell will be caused to overlap the slot 29 of the wedge C and prevent vertical displacement of the wedge, thereby holding the same locked to the retaining element G. It will be evident that at no time during the compression of the mechanism will the friction shell be moved rearwardly with respect to the wedge C to an extent which will permit the edge to become detached from the retaining element G.

The operation of my improved shock absorbing mechanism, assuming a compression stroke, is as follows: The front main follower 15 and the spring cage A will be moved relatively toward each other, thereby forcing the wedge inwardly of the friction shell and setting up a wedging action between the same and the spring resisted friction shoes. The shoes will thus be spaced apart and forced into tight frictional contact with the friction surfaces of the liners 23. Due to the friction existing between the liners and the shoes, the friction shell B will be carried inwardly in unison with the wedge and main follower 15, thereby compressing the two sets of springs. This action will continue until the inner end of the friction shell B engages the front end of the spring cage A, whereupon movement of the friction shell will be positively arrested, compelling the friction shoes to be moved relatively to the friction surfaces of the shell during the remainder of the compression stroke of the mechanism. During this last stage of operation, the resistance offered will be greately augmented due to the friction created between the shoes and friction shell surfaces.

During release, when the actuating force is reduced, the expansive action of the springs J will force the friction shoes outwardly, the friction shell being initially carried therewith due to the friction existing between the shoes and the shell. Outward movement of the shell will be limited by the flanges 35 at the inner ends of the anchoring elements E coming into engagement with the lugs 20 at the forward end of the spring cage. When movement of the shell has thus been arrested, the friction shoes will be forced outwardly with respect to the shell until their movement is limited by the wedge C, movement of which is arrested by the retaining element E engaging the inner ends of the anchoring elements F.

While I have herein shown and described what I now consider the preferred manner of carrying out my invention, the same is merely illustrative, and I contemplate all changes and modifications that come within the scope of the claims appended hereto.

I claim:

1. In a friction shock absorbing mechanism, the combination with a spring cage; of a friction shell, said shell and cage being relatively movable; detachable means for connecting the cage to the shell, for limited relative movement; friction means co-operating with the shell, including a wedge member; means for anchoring the wedge member to the spring cage and maintaining said connecting means locked to the cage and shell, said anchoring means limiting outward movement of the wedge with respect to the friction shell; and spring resistance means opposing relative movement of the friction means and shell with respect to the cage, during a compression stroke.

2. In a friction shock absorbing mechanism, the combination with a spring cage; of a friction shell; a detachable lost motion connection between the shell and cage having shouldered engagement therewith; friction shoes co-operating with the friction shell; a wedge; means for anchoring the wedge to the cage, said means engaging and holding the lost motion connection against lateral movement to prevent disengagement thereof from the spring cage and shell; and spring resistance means opposing movement of the friction shoes.

3. In a friction shock absorbing mechanism, the combination with a friction shell; of a spring cage, said cage and shell having a lost motion connection; friction shoes co-operating with the shell; wedge means co-operating with the shoes; a main spring resistance within the cage, including inner and outer coils both extending into the friction shell and engaging the friction shoes.

4. In a friction shock absorbing mechanism, the combination with a spring cage; of a friction shell, said shell and cage having limited relative movement toward and away from each other; a lost motion connection between the shell and cage, including detachable connecting elements interlocked with the cage and shell; means interposed between said elements for holding the same locked to the shell and cage and also preventing lateral displacement of the shell with respect to the cage; a wedge friction system co-operating with the shell; and spring resistance means within the cage.

5. In a friction shock absorbing mechanism, the combination with a friction shell; of a spring cage, said shell and cage being provided with lugs on the opposite walls thereof; anchoring elements for connecting the shell and cage for lost motion, said anchoring elements having lugs co-operating with the lugs of the cage; friction shoes at opposite sides of the mechanism co-operating with the shell; a wedge held between the shoes and co-operating therewith; retaining means for the wedge engaged with the anchoring elements, said retaining means being interposed between the anchoring elements to hold the same engaged with the lugs of the shell and cage, said anchoring elements and retaining means having interengaging means thereon to prevent relative lateral displacement of said retaining means and anchoring elements; and a spring resistance opposing relative movement of the cage and friction shoes.

6. In a friction shock absorbing mechanism, the combination with a spring cage; of a friction shell, said shell and cage having a detachable lost motion connection; a friction system co-operating with the shell, said system including a wedge member; means confined to longitudinal movement by said lost motion connection for anchoring the wedge to limit outward movement thereof, said anchoring means being detachably connected to the wedge; spring means opposing movement of the friction system and shell toward the spring cage.

7. In a friction shock absorbing mechanism, the combination with a rectangular spring cage having stop shoulders on the opposed walls thereof; of a rectangular friction shell having stop shoulders on the opposed walls thereof, said shell and cage being relatively movable to a limited extent longitudinally of the mechanism; connecting bars having shoulders engaging both the shoulders of the friction shell and spring cage to limit outward movement of the shell with respect to the cage; friction shoes co-operating with the shell; a wedge member interposed between the shoes; a retaining bar for the wedge interposed between said connecting bars, said retaining bar being anchored to the wedge and having shoulders thereon co-operating with the inner end of the connecting bars to limit outward movement of the retaining bar and wedge; means on said connecting bars for limiting the retaining bar to movement in a direction longitudinally of the mechanism, said retaining bar being detachably connected to the wedge; and spring resistance means within the cage co-operating with the friction shoes and shell.

8. In a friction shock absorbing mechanism, the combination with a spring cage; of a friction shell, said shell and cage being relatively movable to a limited extent longitudinally of the mechanism and having a lost motion connection; friction means co-operating with the shell, said means including a wedge member; a retaining member for the wedge anchored to the cage, said retaining member and wedge having interengaging means thereon for holding the wedge anchored to the retaining member, said interlocking means being overlapped by the walls of the shell when the parts are assembled to prevent accidental disengagement of the wedge; and spring resistance means within the cage co-operating with the friction means.

9. In a friction shock absorbing mechanism, the combination with a cage; of a friction shell relatively movable toward and from the cage; a spring resistance; friction means cooperable with said friction shell and spring means, said friction means including a pressure-transmitting wedge; means detachably connected to the shell and cage for limiting their relative separation while permitting relative approach; and means detachably connected with the cage and said wedge limiting the relative separation of the wedge and cage while permitting relative approach thereof.

In witness that I claim the foregoing I have hereunto subscribed my name this 23rd day of February, 1927.

JOHN F. O'CONNOR.